United States Patent [19]

Kondo et al.

[11] Patent Number: 5,466,283
[45] Date of Patent: Nov. 14, 1995

[54] AQUEOUS INK COMPOSITION FOR WRITING INSTRUMENT

[75] Inventors: Masahiro Kondo, Hashima; Nobuo Matsubara, Nagoya, both of Japan

[73] Assignee: Pilot Ink Co., Ltd., Nagoya, Japan

[21] Appl. No.: 115,560

[22] Filed: Sep. 3, 1993

[30] Foreign Application Priority Data

Sep. 7, 1992 [JP] Japan .................................. 4-265509

[51] Int. Cl.⁶ .................................................. C09D 11/14
[52] U.S. Cl. .................. 106/25 R; 106/25 A; 106/20 R; 106/22 F; 106/23 F
[58] Field of Search ...................... 106/25 R, 25 A, 106/23 F, 22 F, 20 R

[56] References Cited

U.S. PATENT DOCUMENTS

| | | | |
|---|---|---|---|
| 3,300,473 | 1/1967 | Christoffel et al. | 106/25 R |
| 3,729,460 | 4/1973 | Patton | 106/25 R |
| 4,146,705 | 3/1979 | Knutson, Jr. | 536/1 |
| 4,156,776 | 5/1979 | Mufti et al. | 106/25 R |
| 4,671,691 | 6/1987 | Case et al. | 401/142 |
| 4,726,845 | 2/1988 | Thompson et al. | 106/25 A |
| 4,838,938 | 6/1989 | Tomida et al. | 106/25 R |
| 5,013,361 | 5/1991 | Case et al. | 106/22 |
| 5,108,505 | 4/1992 | Moffatt | 106/25 R |
| 5,252,727 | 10/1993 | Ullmann et al. | 536/123 |

FOREIGN PATENT DOCUMENTS

| | | |
|---|---|---|
| 0469953 | 2/1992 | European Pat. Off. . |
| 3337866 | 4/1984 | Germany . |
| 2131040 | 6/1984 | United Kingdom . |

*Primary Examiner*—Helene Klemanski
*Attorney, Agent, or Firm*—Fitzpatrick, Cella, Harper & Scinto

[57] ABSTRACT

There is provided aqueous ink of high viscosity for writing instrument, capable of maintaining stable dispersed or dissolved state of the coloring material even after a prolonged period and exhibiting high fluidity under a shearing force applied by the writing operation in the ball point pen.

The ink contains, as essential components, a coloring material, succinoglycan which is an organic acid-modified heteropolysaccharide composed of glucose and galactose as component monosaccharides, and aqueous medium in which water constitutes at least 50 wt. %.

4 Claims, No Drawings

AQUEOUS INK COMPOSITION FOR WRITING INSTRUMENT

BACKGROUND OF THE INVENTION

1. Field of the Invention

The present invention relates to an aqueous ink composition for writing instrument, and more particularly to aqueous ink adapted for use in a ball point pen.

2. Related Background Art

Conventional ball point pens are generally classified into oil ball point pens utilizing highly viscous oily ink and aqueous ball point pens utilizing aqueous ink of low viscosity, but highly viscous aqueous ink is recently proposed for the aqueous ball point pens.

Such highly viscous aqeuous ink maintains a high viscosity under a weak shearing force, but exhibits a low viscosity under a high shearing force, as generated by the rotation of the ball in the writing operation of the ball point pen.

As examples of the above-mentioned proposal, the Japanese Patent Publication No. 64-8673 discloses the use of xanthane gum, and the Japanese Patent Laid-open Application No. 4-214782 discloses the use of wellan gum, for increasing the viscosity of aqueous ink.

However, it is difficult, in such gum-containing aqueous ink, to maintain long-term stability of dispersion of the pigment constituting the coloring material, and the ball point pen employing such ink may result, in the writing after a prolonged time, in a pale or excessively dense record, and may eventually become incapable of writing operation due to the ink blocking at the pen tip by pigment coagulation.

SUMMARY OF THE INVENTION

The present invention is to provide aqueous ink of high viscosity, which is free from detrimental influence on the dispersed or dissolved stage of the coloring material even after a prolonged time.

The present invention is to provide an aqueous ink composition for writing instrument, containing as essential components (1) a coloring material, (2) an organic acid-modified heteropolysaccharide of an average molecular weight of about 1 million to 8 million (hereinafter called succinoglycan) consisting of a basic unit composed of glucose/galactose/pyruvic acid or salt thereof/succinic acid or salt thereof/acetic acid with a molar ratio of 5–8/1–2/0.5–2/0.5–2/0.5–1, and (3) aqueous medium containing water and water-soluble organic solvent, in which water constitutes at least 50 % by weight.

The above-mentioned succinoglycan has a skelton structure of a heteropolysaccharide composed of glucose and galactose of the above-mentioned molar ratio and having a side chain, in which pyruvic acid is is bonded by linkage to the carbon atoms at 4 and 6 positions of monosaccharide at the end of said side chain, and a carboxyl radical of acetic acid and on carboxyl radical of succinic acid is bonded by ester linkage to the free hydroxyl radical of the monosaccharide constituent, wherein the free carboxyl radical of pyruvic acid and succinic acid may be present as sodium, potassium or calcium salt. Such succinoglycan is employed in an amount of 0.01 to 8 wt. %, preferably 0.1 to 4 wt. % in the ink composition.

The coloring material can be pigments or dyes ordinarily employed in the aqueous ink.

Examples of the pigment include inorganic pigments such as carbon black or iron oxide, and organic pigments such as azo pigments, anthraquinone pigments, condensed polyazo pigments, thioindigo pigments, metal complex pigments, phthalocyanine pigments, perynone/perylene pigments, dioxazine pigments and quinaridone pigments.

Examples of the dye include acid dyes such as Eosine (C.I. 45380), Acid Phloxine (C.I. 45410), Erythrosin (C.I. 45430), tartrazine (C.I. 19140), Sunset Yellow FCF (C.I. 15985), Acid Rhodamine (C.I. 45100), Acid Violet 6B (C.I. 42640), Brilliant Blue FCF (C.I. 42090), Water Black R510 (C.I. 50420) etc., direct dyes such as Direct Fast Yellow GC (C.I. 29000), Violet BB (C.I. 27905), Direct Sky Blue 5B (C.I. 24400), Black (C.I. 135255) etc., and basic dyes such as Rhodamine B (C.I. 45170 ), Rhodamine 6GDN (C.I. 45160 ), Methyl Violet (C.I. 42535), Victorial Blue BOH (C.I. 42595) etc. Such coloring material is employed in an amount of 1 to 25% by weight, preferably 2 to 15% by weight, in the ink composition.

The aqueous medium contains water and water-soluble organic solvent, in which water constitutes at least 50% by weight.

Said water-soluble organic solvent can be, for example, ethylene glycol, diethylene glycol, propylene glycol, thiodiethylene glycol, glycerine or triethanolamine, suitably selected for the purpose of suppressing the ink drying at the pen tip, providing the written record with water resistant property, or as a co-solvent for the dye, and is employed in an amount of 5 to 30% by weight in the ink composition.

The aqueous medium may additionally contain, if necessary, various surfactants for improving the ink fluidity or stabilizing pigment dispersion, a water-soluble resin such as polyvinylpyrrodidone, polyvinyl alcohol, water-soluble acrylic resin or gum arabic for preventing the blotting of written record or as protective colloid for the pigment, lubricant, moisture retaining agent, antiseptic and antirusting agent.

The aqueous ink of the above-explained composition is in a gel state and exhibits fluidity by vigorous agitation. Consequently it is adapted for use in a ball point pen of a structure similar to that of the oil ball point pen employing highly viscous oil ink, namely a simple structure consisting of a pen tip not involving additional members such as the ink absorbent member, valve structure and regulator (a regulating member for temporarily storing the ink supplied in excess from the ink absorbent member and regulating the replacement with air), and a pipe member serving as ink reservoir.

DETAILED DESCRIPTION OF THE PREFERRED EMBODIMENTS

Ink samples of examples 1–6 and reference examples 1–4 were prepared and subjected to the measurement of the particle size of the dispersed pigment, immediately after the preparation (initial) and after 2 months. Also each sample was filled in a ball point pen of a structure similar to that of said oil ball point pen, and subjected to writing tests immediately after preparation and after the pen was left standing for 2 months with the pen tip downwards.

The particle size of the dispersed pigment was measured by the light transmission method, based on the liquid phase sedimentation.

The ink sample was prepared by gradually adding succinoglycan (xanthane gum or wellan gum in case of reference examples) into a predetermined amount of water under agitation, then, after uniform dissolution, charging the coloring material, water-soluble organic solvent and other additives and uniformly dissolving or dispersing these components.

Tables 1 and 2 show the compositions and test results of the inks of, respectively, the examples and the reference examples.

The compositions in said tables are all represented by parts by weight. The components numbered in the tables are explained in the following:

(1) aqueous pigment dispersion consisting of 15 wt. % of carbon black, 4 wt. % of polyvinyl alcohol and the balance of water;

(2) aqueous pigment-dispersion consisting of 14 wt. % of quinacridone red E (C.I. pigment red 209), 12 wt. % of polyvinyl alcohol and the balance of by water;

(3) aqueous pigment dispersion consisting of 20 wt. % of indanthrone blue (C.I. pigment blue 60), 4 wt. % of anionic surfactant and the balance of by water;

(4) aqueous pigment dispersion consisting of 35 wt. % of carbon black, 5 wt. % of nonionic surfactant and the balance of by water;

(5) Water black R510 (C.I. 50420) (trade name of Orient Chemical Industries Co., Ltd.);

(6) Rheozan (trade name of Sansho Co., Ltd.), which is succinoglycane of an average molecular weight of about 6 million;

(7) Prisurf M208B (trade name of Dai-ichi Kogyo Seiyaku Co., Ltd. );

(8) Proxel XL-2 (trade name of ICI, UK);

(9) Belzon crystal 120 (trade name of Daiwa Kasei Co., Ltd.).

In the writing test after 2-month standing, the symbols have the following meanings:

○: satisfactory writing was possible, with the record same as in the initial writing;

Δ: the written record was excessively dense in comparison with that in the initial writing, and the feeling of writing was unsatisfactory;

X: writing not possible (ink flow path of the pen tip blocked by pigment coagulation).

As will be apparent from Tables 1 and 2, in the inks of the reference examples, which are aqueous inks of high viscosity employing xanthane gum or wellan gum, there was observed an increase in the particle size of the dispersed pigment with the elapsed time, indicating the formation of larger particles by the coagulation of dispersed pigment and resulting in unsatisfactory writing performance of the ball point pens. On the other hand, in the aqueous inks of the present invention, the particle size of the dispersed pigment after elapsed time remains substantially same as the initial particle size, indicating that the pigment retains the stable dispersed state. Also the writing performance of the ball point pens is satisfactory, same as in the initial state.

TABLE 1

| Components | Note | Examples | | | | | |
|---|---|---|---|---|---|---|---|
| | | 1 | 2 | 3 | 4 | 5 | 6 |
| Coloring material | | | | | | | |
| Black pigment paste A | (1) | 40.0 | | | | | |
| Red pigment paste | (2) | | 43.0 | | | | |
| Blue pigment paste | (3) | | | 30.0 | | | |
| Black pigment paste B | (4) | | | | 17.0 | | |
| Black dye | (5) | | | | | 7.0 | |
| vermilion dye (eosin) | | | | | | | 3.0 |
| pink dye (phloxine) | | | | | | | 1.5 |
| Gum succinoglycan | (6) | 0.4 | 1.5 | 0.4 | 3.0 | 0.5 | 3.5 |
| Aqueous medium | | | | | | | |
| diethylene glycol | | | | | | 10.0 | 10.0 |
| glycerin | | 10.0 | 10.0 | | 5.0 | 10.0 | |
| ethylene glycol | | | 10.0 | 10.0 | 5.0 | | 10.0 |
| moisture retaining agent (urea) | | 10.0 | | 8.0 | 8.0 | | |
| phosphate ester lubricant | (7) | 1.0 | 1.0 | 1.0 | 1.0 | 1.0 | 1.0 |
| antiseptic | (8) | 0.2 | 0.2 | 0.2 | 0.2 | 0.2 | 0.2 |
| antirusting agent | (9) | 0.1 | 0.1 | 0.1 | 0.1 | 0.1 | 0.1 |
| water | | 38.3 | 34.2 | 50.3 | 60.7 | 71.2 | 70.7 |
| Test items | | | | | | | |
| Initial average particle size of pigment (μm) | | 0.09 | 0.12 | 0.10 | 0.08 | — | — |
| Average particle size after 2 months (μm) | | 0.09 | 0.13 | 0.10 | 0.09 | — | — |
| Writing performance after 2 months from pen filling | | ○ | ○ | ○ | ○ | ○ | ○ |

TABLE 2

| Components | Note | Comparative Examples | | | |
|---|---|---|---|---|---|
| | | 1 | 2 | 3 | 4 |
| Coloring material | | | | | |
| Black pigment paste A | (1) | 40.0 | | | |
| Red pigment paste | (2) | | 43.0 | | |
| Blue pigment paste | (3) | | | 30.0 | |
| Black pigment paste B | (4) | | | | 17.0 |
| Black dye | (5) | | | | |
| Vermilion dye (eosin) | | | | | |
| Pink dye (phloxine) | | | | | |
| Gum | | | | | |
| xanthane gum | | 0.3 | | | 0.45 |
| wellan gum | | | 0.4 | 1.0 | |
| Aqueous medium | | | | | |
| diethylene glycol | | | | | |
| glycerin | | 10.0 | 10.0 | | 5.0 |
| ethylene glycol | | | 10.0 | 10.0 | 5.0 |
| moisture retaining agent (urea) | | 10.0 | | 8.0 | 8.0 |
| phosphate ester lubricant | (7) | 1.0 | 1.0 | 1.0 | 1.0 |
| antiseptic | (8) | 0.2 | 0.2 | 0.2 | 0.2 |
| antirusting agent | (9) | 0.1 | 0.1 | 0.1 | 0.1 |
| water | | 38.4 | 35.3 | 49.7 | 63.2 |
| Test items | | | | | |
| Initial average particle size of pigment (μm) | | 0.09 | 0.12 | 0.10 | 0.08 |
| Average particle size after 2 months (μm) | | 0.26 | 0.20 | 0.56 | 0.32 |
| Writing performance after 2 months from pen filling | | Δ | Δ | X | X |

What is claimed is:

1. An aqueous ink composition, comprising from 1–25 wt. % of a coloring material, and from 0.01–8 wt. % of an organic acid-modified heteropolysaccharide having an average molecular weight of about 1 to 8 million, said organic acid-modified heteropolysaccharide comprising a basic unit of glucose/galactose/pyruvic acid or salt thereof/succinic acid or salt thereof/acetic acid having a molar ratio of 5–8/1–2/0.5–2/0.5–2/0.5–1, said ink composition further comprising an aqueous medium containing water and water-soluble organic solvent said aqueous medium comprising at least 50 wt. % water.

2. The aqueous ink composition according to claim 1, wherein said organic acid-modified heteropolysaccharide consists of a basic unit of glucose/galactose/pyruvic acid or salt thereof/succinic acid or salt thereof./acetic acid.

3. The aqueous ink composition according to claims 1 or 2, wherein said organic acid-modified heteropolysaccharide is contained at from about 0.1 to about 4 wt. %.

4. The aqueous ink composition according to claim 3, wherein said organic acid-modified heteropolysaccharide is succinoglycan.

* * * * *

UNITED STATES PATENT AND TRADEMARK OFFICE
CERTIFICATE OF CORRECTION

PATENT NO. : 5,466,283

DATED : November 14, 1995

INVENTOR(S) : Masahiro Kondo et al.

It is certified that error appears in the above-identified patent and that said Letters Patent is hereby corrected as shown below:

COLUMN 1

Line 55, "linkage" should read --ketal linkage--
    Line 59, "on" should read --one--.

COLUMN 2

Line 6, "quinaridone" should read --quinacridone--
    Line 9, "tartrazine" should read --Tartrazine--
    Line 14, "Black" should read --Black G--
    Line 16, "Victorial" should read --Victoria--
    Line 25, "glycerine" should read --glycerin--.

UNITED STATES PATENT AND TRADEMARK OFFICE
CERTIFICATE OF CORRECTION

PATENT NO. : 5,466,283

DATED : November 14, 1995

INVENTOR(S): Masahiro Kondo et al.

Page 2 of 2

It is certified that error appears in the above-identified patent and that said Letters Patent is hereby corrected as shown below:

COLUMN 3

Line 17, "by" should be deleted
    Line 20, "by" should be deleted
    Line 23, "by" should be deleted
    Line 24, "black" should read --Black--
    Line 28, "succinoglycane" should read --succinoglycan--.

Signed and Sealed this

Sixteenth Day of April, 1996

BRUCE LEHMAN

Attest:

Attesting Officer

Commissioner of Patents and Trademarks